March 17, 1942.   B. STECHBART   2,276,430
FRICTION CLUTCH
Filed Feb. 27, 1940

INVENTOR
BRUNO STECHBART
BY Robert F. Miehle, Jr.
ATTY.

Patented Mar. 17, 1942

2,276,430

UNITED STATES PATENT OFFICE 2,276,430

FRICTION CLUTCH

Bruno Stechbart, Chicago, Ill., assignor to The Bell & Howell Company, Chicago, Ill., a corporation of Illinois Application February 27, 1940, Serial No. 321,023

5 Claims. (Cl. 64—30)

My invention relates particularly to film reel driving mechanism for motion picture machines although not limited to this use alone.

In the conventional motion picture machine the film is positively driven by the mechanism of the machine and is drawn from a roll thereof on a feed reel and wound on a take up reel which is driven with the mechanism of the machine by means of a suitable yielding take up drive mechanism, the yielding take up drive mechanism accommodating for the slowing up of the take up reel as the film roll thereon increases in diameter.

The aforesaid yielding driving mechanism may take the form of a yielding constant power friction drive device, but such a device is limited in its capacity of accommodating variance of take up film roll diameter in that the driving power thereof cannot exceed that which would exert damaging tension on the film at minimum take up film roll diameters.

The general object of my invention resides in the provision of a simple and effective friction clutch which is well adapted for the driving of the film take up reel of a motion picture machine and which has increased capacity for accommodating variance of take up film roll diameter, the invention contemplating quick, convenient and predetermined change of the driving power of the clutch.

With this object in view my invention consists in certain features of novelty in the construction, combination, and arrangement of parts by which the said object and certain other objects, hereinafter appearing, are effected all as fully described with reference to the accompanying drawing and more particularly pointed out in the appended claims.

In the said drawing—

Figure 1:
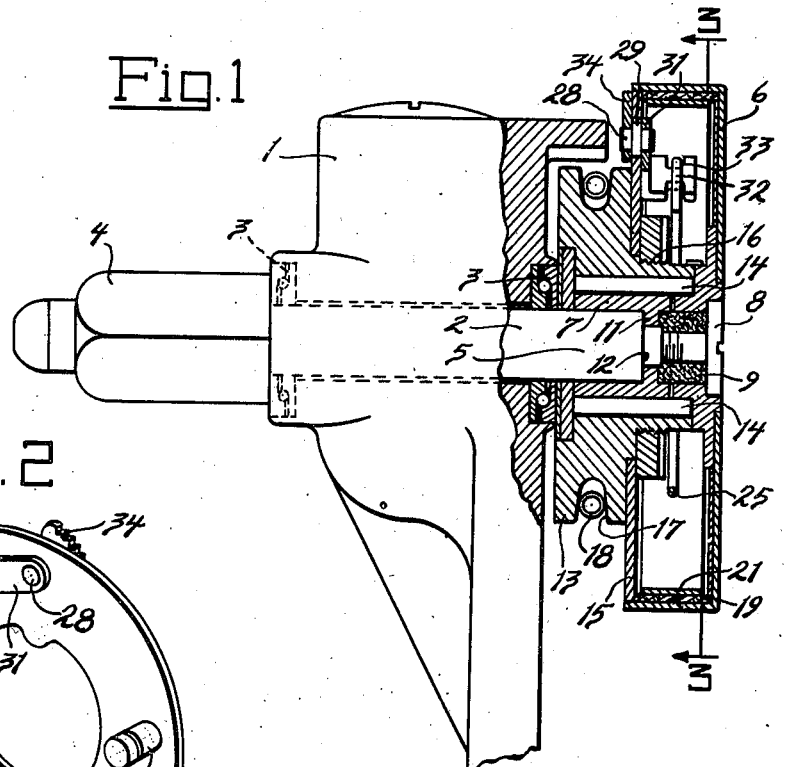
Figure 1 is a side elevation of a motion picture film reel take up drive embodying my invention, with parts broken away and shown in section.

Referring to the drawing, 1 designates a frame member in the form of a film reel spindle arm, and a film reel shaft or spindle 2 extends through and is rotatably mounted thereon by means of bearings 3. See Figure 1. The spindle has both ends thereof projecting from the arm 1, as designated at 4 and 5, of which the end 4 forms a film reel mount.

Secured on the end 5 of the spindle is a friction drum 6, facing and spaced from the arm 1, and a bushing 7 arranged between the drum and the frame arm, these parts being so secured by means of a headed screw 8 screwthreaded into the end 5 and clamping a bushing 9, secured in the bore of the drum, and an internal flange 11 of the bushing 7 between its head and a shoulder 12 on the spindle end 5.

A bored belt pulley 13 is rotatably mounted on the spindle end 5 between the drum 6 and the arm 1 by means of the bushing 7 and bearing rollers 14 engaged between this bushing and the bore of the pulley. A bored carrier disk 15 is secured on the pulley 13, as designated at 16, and the pulley 13 proper involving a belt groove 17 is disposed between this carrier and the arm 1, the carrier disk closing the open or inner side of the drum 6. A drive belt 18 engaged in the belt groove 17 serves to drive the pulley.

Figure 2:
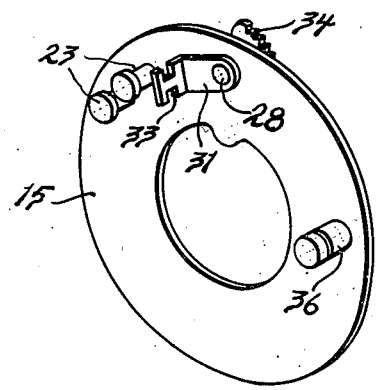
Figure 2 is a perspective view of a portion of the mechanism.

The interior of the drum 6 is faced with suitable friction material 19, and an expansible friction clutch band 21 is disposed within the drum for frictional engagement with said friction material to form a friction clutch with the drum. One end of the band 21 is turned inwardly, as designated at 22, and the carrier disk 15 is provided with angularly spaced studs 23 between which the end 22 is engaged to angularly fix the friction clutch band 21 with the carrier disk 15 and the drive pulley 13. See Figures 2, 3 and 4.

The other end of the band 21 is also turned inwardly, as designated at 24, and a curved spring 25 extends about the spindle 2 and the hub of the pulley 13 and has one end thereof turned, as designated at 26, and engaged through an aperture 27 in the end 24 of the band 21 for expanding the band into frictional engagement with the facing 19 of the drum 6.

Figure 4:
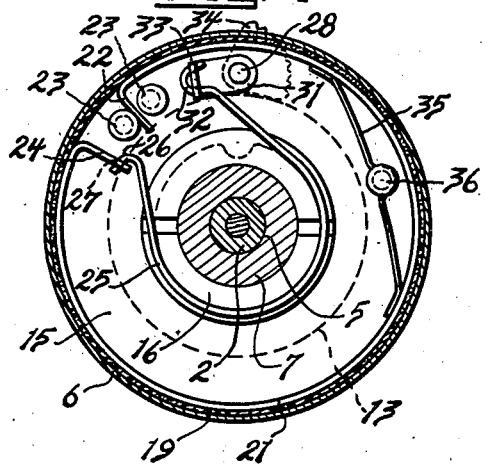
Figures 3 and 4 are sectional views substantially on the line 3—3 of Figure 1 and showing the mechanism in different positions of adjustment.

A stud 28 extends through and is rotatably mounted on the carrier disk 15, as designated at 29 in Figure 1, and an arm 31 is secured on this stud on the inside of the carrier disk. The other end of the spring 25 is formed to provide a hook 32 which engages a laterally extending undercut portion 33 at the free end of the arm 31 for reaction of the spring thereagainst. A toothed segment arm 34 is secured on the stud 28 on the outside of the carrier disk 15 for manual actuation of this arm and with it the arm 31, the periphery of the pulley 13 serving as stop means limiting movement of the arms 31 and 34 in both directions, as shown in Figures 3 and 4.

Figure 3:
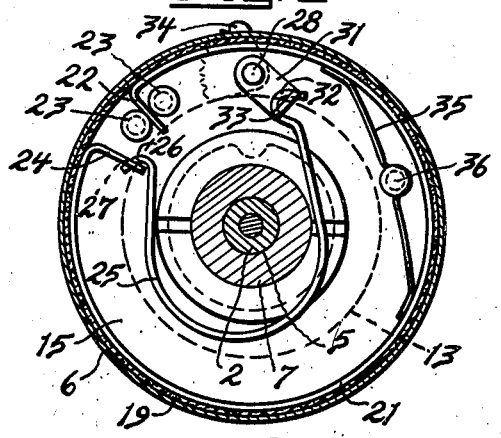

When the arms 31 and 34 are in the positions shown in Figure 3, the spring 25 exerts a relatively light pressure on the band 21 with resultant relatively light driving power of the friction clutch. When the arms 31 and 34 are in the positions shown in Figure 4, the spring exerts a relatively heavy pressure on the band 21 with resultant heavy driving power of the friction clutch. The arm 31 has over center relationship with the spring 25, as will be observed, so that this spring retains the arms 31 and 34 in their opposite positions, the movement of these arms being limited by stop engagement of the arm 34 with the periphery of the pulley 13.

Another spring 35, arranged within the band 21, has its intermediate portion engaged on a stud 36 on the carrier disk 15 and, engaging the band with its end portions, serves to urge the band outwardly toward the drum 6 in the region of the angularly fixed end of the band.

Thus it will be observed that the driving power of the friction clutch may be quickly, conveniently and predeterminately changed to conform with instant requirements, the structure being admirably adapted for a take up film reel drive.

While I have thus described my invention, I do not wish to be limited to the precise details described as changes may be readily made without departing from the spirit of my invention, but having thus described my invention I claim as new and desire to secure by Letters Patent the following:

1. In a device of the character described, the combination with relatively rotatable friction clutch members, of means for maintaining frictional clutching engagement of said clutch members comprising spring means, pivoted means operative on said spring means and movable into and out of position for increasing the friction of said engagement and stop means limiting movement of said pivoted means, said pivoted means having over center relationship with said spring means whereby said spring means retains said pivoted means in its opposite positions.

2. In a device of the character described, the combination with relatively rotatable friction clutch members comprising a friction drum and an expansible friction band therein, of a carrier on which said band is mounted in angularly fixed relation therewith, and means operative between said band and carrier for maintaining frictional clutching engagement of said clutch members comprising a spring means, a member operative upon said spring means and pivotally mounted on said carrier for movement into and out of position for increasing the friction of said engagement and stop means limiting movement of said pivoted member, said pivoted member having over center relationship with said spring means whereby said spring means retains said pivoted member in its opposite positions.

3. In a device of the character described, the combination with a revoluble shaft and relatively rotatable friction clutch members carried with said shaft and one of which is angularly fixed therewith, said clutch members comprising a friction drum and an expansible friction band therein, of a carrier having one end of said band angularly secured therewith, and means operative between the other end of said band and said carrier for maintaining frictional clutching engagement of said clutch members comprising a curved spring extending about said shaft and having one end thereof engaged with said other end of said band and a member movably mounted on said carrier and engaged with the other end of said spring and movable into and out of position for increasing the friction of said clutching engagement.

4. In a device of the character described, the combination with a revoluble shaft, of a friction clutch drum fixed on said shaft, an expansible friction clutch band within said drum, of a carrier rotatably mounted on said shaft and having one end of said band angularly fixed therewith, and means operative between the other end of said band and said carrier for maintaining frictional clutching engagement of said clutch members comprising a curved spring extending about said shaft and having one end thereof engaged with said other end of said band, a member pivotally mounted on said carrier and engaged with the other end of said spring and movable into and out of position for increasing the friction of said clutching engagement and stop means limiting movement of said pivoted member, said pivoted member having over center relationship with said spring whereby said spring retains said pivoted member in its opposite positions.

5. In a device of the character described, the combination with a frame member and a shaft rotatably mounted thereon, a friction clutch drum fixed on said shaft and facing said frame member, an expansible friction clutch band within said drum, a carrier rotatably mounted on said shaft between said band and said frame member and having one end of said band angularly fixed therewith, a belt pulley fixed with said carrier and disposed between it and said frame member, and means operative between the other end of said band and said carrier for maintaining frictional clutching engagement of said clutch members comprising a curved spring extending about said shaft and having one end thereof engaged with said other end of said band and a member movably mounted on said carrier and engaged with the other end of said spring and movable into and out of position for increasing the friction of said clutching engagement.

BRUNO STECHBART.